United States Patent
Rohani

(10) Patent No.: US 6,195,342 B1
(45) Date of Patent: Feb. 27, 2001

(54) METHOD FOR DETERMINING HAND-OFF CANDIDATES IN A NEIGHBOR SET IN A CDMA COMMUNICATION SYSTEM

(75) Inventor: Kamyar Rohani, Grapevine, TX (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 08/977,913

(22) Filed: Nov. 25, 1997

(51) Int. Cl.$^7$ ........................................... H04J 3/06
(52) U.S. Cl. ............................................. 370/331; 370/332
(58) Field of Search .................................. 370/335, 331, 370/332, 337; 375/200, 206; 455/33.4, 422, 442

(56) References Cited

U.S. PATENT DOCUMENTS

| | | | |
|---|---|---|---|
| 5,218,716 | * | 6/1993 | Comroe et al. ..................... 455/442 |
| 5,508,708 | | 4/1996 | Ghosh et al. . |
| 5,640,414 | * | 6/1997 | Blakeney et al. .................... 375/200 |
| 5,722,074 | * | 2/1998 | Muszynski .......................... 455/422 |
| 6,038,448 | * | 3/2000 | Chheda et al. ....................... 455/436 |

OTHER PUBLICATIONS

"Soft Handoff Pilot Detection", New Orleans, LA, Jan. 10, 1994, TR45.5.3.4/94.01, Rod Walton and Mark Wallace.
Handoff and Cell Identification, CDMA Network Engineering Handbook, pp. 9–1/9–38.
Joint Technical Committee (JTC), JTC(AIR)/94.10.31–022R6, "Proposed CDMA PCS Standard", Ed Tidemann.

* cited by examiner

Primary Examiner—Huy D. Vu
Assistant Examiner—Alexander Boakye
(74) Attorney, Agent, or Firm—Charles W. Bethards

(57) ABSTRACT

A CDMA communication system (400) includes a plurality of base stations (410, 420 and 430) transmitting at least a corresponding plurality of pilot signals. A mobile station (401) in a coverage area of the system (400) receives at least one of the plurality of pilot signals and transmits a Pilot Strength Measurement Message that includes a Neighbor Set of a list of a plurality of candidate pilots for a and-off routine. A method and apparatus for determining the Neighbor Set includes finding a location of the mobile station (401) in the coverage area of system (400) and determining the list of plurality of candidate pilots in the Neighbor Set according to the location of the mobile station (401).

4 Claims, 3 Drawing Sheets

STEP 110

STEP 120

STEP 130

STEP 110

STEP 120

STEP 130

METHOD FOR DETERMINING HAND-OFF CANDIDATES IN A NEIGHBOR SET IN A CDMA COMMUNICATION SYSTEM

FIELD OF THE INVENTION

The present invention relates to cellular communication systems, and more particularly, to a method and apparatus for determining base station candidates for hand-off in a code division multiple access communication system.

BACKGROUND OF THE INVENTION

Hand-off is a process by which a network of base stations and a mobile station maintain their communication when the mobile station travels from one coverage area to another. Generally, the coverage areas in a communication system are pre-defined by the geographical locations of its base stations, or may be defined in combination with the call loading level of base stations. Each coverage area is defined as a cell which is normally served by a base station. Furthermore, each cell may be divided into several sectors such that each sector provides communication in a coverage area. In a code division multiple access (CDMA) communication system, two types of hand-off procedures are supported, namely: hard hand-off, and soft hand-off. The communication link during a soft hand-off is transferred to another carrier which has the same frequency as the carrier frequency currently in progress. As a result, a mobile station which has commenced a soft hand-off would not disrupt its present communication link during the hand-off process. In hard hand-off, the communication link which is currently in progress is disrupted for hand-off to a different carrier frequency.

In CDMA systems, a pilot channel on a specific code channel is transmitted from each base station. If a cell is divided into sectors, a pilot channel is also assigned to each sector. Among other uses, the pilot channels are used to direct the mobile stations hand-off routines. Once a mobile station is moved into a coverage area, a list of all cells and sectors that are in the communication system is transmitted to the mobile station. The list contains a list of pilot signals of many cells and sectors. The mobile station constantly is searching for pilot signals of the cells and sectors that are in the list. The mobile station measures the strength of pilot signals which then are used as a criteria to create a list of possible candidate pilot signals for future hand-off. Since the list of all pilot signals is typically very long, the mobile station spends a long time scanning for all pilot signals, and in the process, consumes battery power. Moreover, scanning for a long list of pilot signals usually requires a complex search engine; and the search engine complexity further increases the mobile station battery power consumption.

The mobile station hand-off process is initiated by transmitting a message to the base station which contains the list of candidate pilot signals. In CDMA system protocol, this message is called: Pilot Strength Measurement Message. The candidate pilot signals are ordered according to a priority which is generally based on the likelihood of success of completing the hand-off routine. As a result, a limited candidate list of pilot signals is created. Once the candidate list is transmitted to the base station, the base station subsequently responds back in a message, Hand-off Direction Message, to the mobile station with a direction for initiating the hand-off. Once the hand-off is completed, the mobile station transmits a message, Hand-off Completion Message, indicating a successful completion of the hand-off process.

If a selected pilot candidate fails to complete the hand-off process during a hand-off routine, the communication system would resort to other pilot candidates in the pilot candidate list which were received in Pilot Strength Measurement Message. Since a limited candidate list is acquired, the list of pilot signals may be exhausted before the hand-off routine is successfully completed. In the case of soft hand-off process, the hand-off routine should be completed within a period of time such that the call is not interrupted and undue delay is prevented. If the list is exhausted before the hand-off process is completed, the mobile station performs either an unplanned termination of the call or tries to create a new list of candidates by searching for other pilot signals which further delays the hand-off process. In either case, the result is highly undesirable.

Therefore, there is a need for an improved method and apparatus of creating a list of pilot signal candidates for a hand-off routine.

THE DETAILED DESCRIPTION OF THE PREFERRED EMBODIMENT(S)

Figure 1:
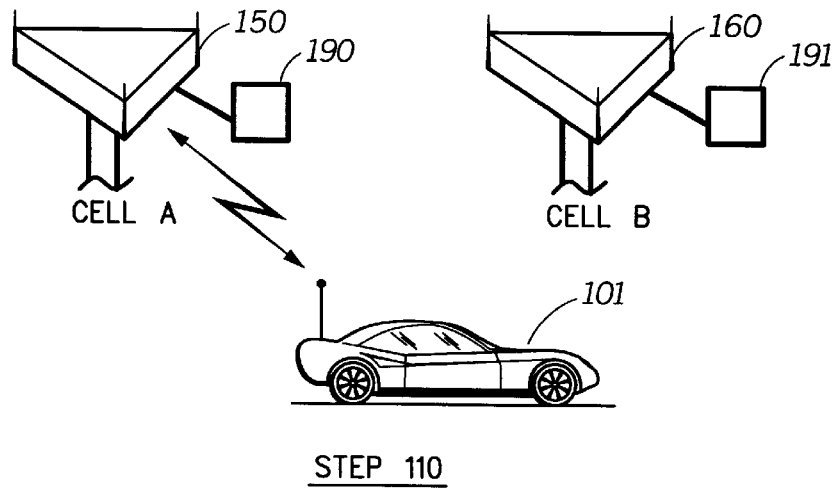
FIG. 1 depicts various steps of a hand-off routine from one base station to another.
Figure 1:
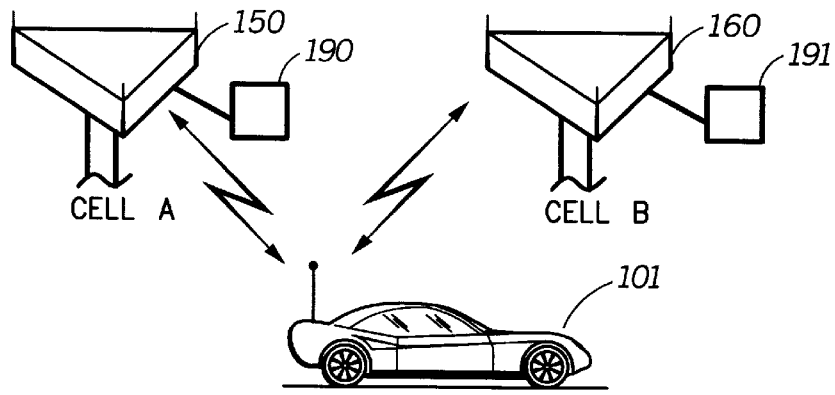
Figure 1:
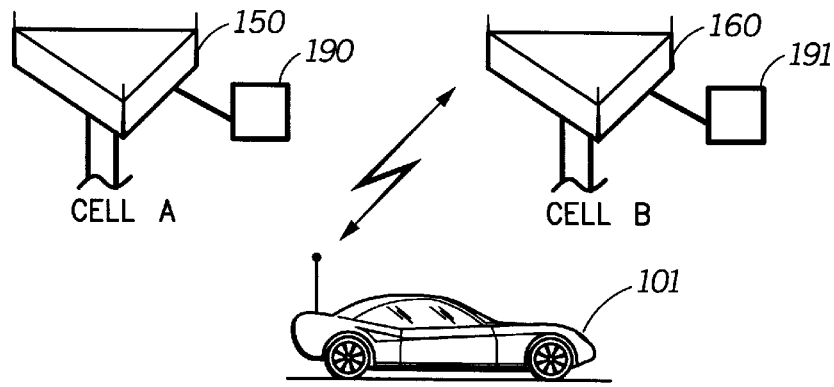

A communication system provides wireless communication in a coverage area and includes a plurality of base stations and at least a mobile station. The plurality of base stations transmit at least a corresponding plurality of pilot signals. The mobile station receive at least one of the plurality of pilot signals and transmits a message which includes a list of a plurality of candidate pilot signals for a hand-off routine. The list of candidate pilot signals is determined, according to one aspect of the present invention, by a method including a step of finding a location of the mobile station in the coverage area, and a step of determining the list of the plurality of candidate pilot signals according to the location of the mobile station.

More particularly, in a code division multiple access communication system, the Pilot Strength Measurement Message which is transmitted by a mobile station contains four sets of candidate lists. The sets are ordered in a predetermined priority. The first priority set is called the Active Set. The base station candidates listed in the Active Set have already a forward traffic channel assigned to the mobile station. The second highest priority set is the Candidate Set. The candidate list in the Candidate Set are those cells and sectors which their pilot signals have been received by the mobile station with sufficient strength to indicate that an associated forward link will successfully be demodulated. The third highest priority set is the Neighbor Set. The candidate list in the Neighbor Set are those cells and sectors that the strength of their pilot signals indicated that the associated traffic channel is likely to be demodulated. The list in the Neighbor Set excludes the candidates lists in the Active and Candidate Sets. The forth or the last priority set is the Remaining Set. The Remaining Set contains a list of all possible pilots in the communication system excluding the lists contained in the Active, Candidate and Neighbor Sets.

According to another aspect of the present invention, a method of determining a list of candidate pilot signals in a Neighbor Set for a hand-off in a communication system includes finding a location of a mobile station, and determining the list of candidate pilot signals according to the location of the mobile station in the coverage area of the communication system. Each base station is transmitting at least a pilot signal to indicate its presence and to facilitate initiating communication with the base station from a mobile station. A mobile station receives and measures the strength of the pilot signals to form the basis for determining a Pilot Strength Measurement Message which includes the Neighbor Set for possible hand-off.

According to a CDMA protocol, the mobile stations acquire the pilot signals pseudo codes, PN codes, timing from the base station. In searching for pilot signals, the mobile station scans for pilot channel signals with the known PN sequence. However, due to scattering effect, the mobile station measures the pilot signals strength over a 10–20 uSec window and sums the results. In the Pilot Strength Measurement Message, the mobile station reports the result of the summed signal strength measurements. The accuracy of the measurement over the window is crucial for future hand-off procedure. If the information in Pilot Strength Measurement Message are not accurate, the hand-off would most likely fail. This may result in unplanned termination of the calls. To perform accurate measurement, a complex search engine is often employed which adds to the power consumption of the mobile station.

A mobile station also acquires more accurate results when it spends more time gathering the information from the pilot signals. However, the mobile stations generally have a budgeted power consumption that prevents them from spending long period of time in gathering the pilot channels information. Moreover, a CDMA communication system has many cells and sectors each having an associated pilot channel. To create a complete list of candidates for each sets of the candidates, the mobile station may need to spend a very long time scanning for every pilot channel in the communication system. To solve the problem, in the prior art, the communication system operators, while complying with the CDMA system protocol, have limited the Pilot Strength Measurement Message to contain only the Active and Candidate Sets information. As a result, the mobile station is creating a limited, and very often, inadequate sets of pilot channels information.

During a hand-off routine, the communication system would resort to other candidate in other candidate sets if all candidates in a set that were previously selected fail to complete the hand-off process. Therefore, the limited sets of pilot channels gathered according to the prior art method is inadequate because the list of candidates in both the Active and Candidate Sets may be exhausted very rapidly before the hand-off process is completed. In the case of soft hand-off process, the hand-off process should be completed within a period of time such that the call is not interrupted and undue delay is prevented. If the candidate lists in Active and Candidate Sets are exhausted before the hand-off process is completed, the mobile station performs either an unplanned termination of the call or tries to create a new list of candidates by searching for pilot signals which further delays the hand-off process. In either case, the result is highly undesirable.

In accordance with the present invention, by determining a Neighbor Set according to the location of the mobile station, the mobile station avoids measuring the pilot signals of many neighbor base stations. As a result, a substantial amount of battery power is conserved in the mobile station. The candidate lists in the Pilot Strength Measurement Message, according to present invention, includes a Neighbor Set while conserving mobile station battery power.

With reference to FIG. 1, a mobile station 101 performs three steps, 110, 120 and 130, in a routine for making a hand-off from base station 150 to 160. The steps 110, 120 and 130 are initial, process, and completion steps respectively. In the initial step 110, the mobile station 101 transmits a Pilot Strength Measurement Message to base station 150. The message contains information about Active, Candidate, Neighbor, and Remaining Sets of pilot candidates for possible hand-off. In the process step 120, the candidate list in each set in the order of priority of sets are used for completing a hand-off routine. Once the base station 160 is selected, at the completion step 130, the base station 150 and mobile station 101 terminate the communication, and mobile station 101 continues the communication with the base station 160. In the process step 120, if the candidate list in one set is exhausted before the hand-off is completed, a new candidate in the next lower priority set is used for possible hand-off. The Neighbor Set has lower priority than the Candidate Set. Once the Candidate Set is exhausted before completing the hand-off, a new candidate from the Neighbor Set is therefore selected. However, according to the prior art, a Neighbor Set is not compiled and the hand-off process may terminate prematurely.

Before the initial step 110 or when the mobile station moves to the coverage area, a list of all neighbor base stations is transmitted to the mobile station 101. The mobile station 101 measures signal strength of all or most of the pilot signals of base stations in the list. However, this list may contain a long list of neighbor base stations which then would require the mobile station to spend a long time scanning for the pilot signals. Since the Neighbor Set is determined according to the location of the mobile station, the list has been reduced in number of pilot signals that the mobile station would scan. As a result, the mobile station battery power consumption is improved while providing additional hand-off candidates in the Neighbor Set.

Figure 2:
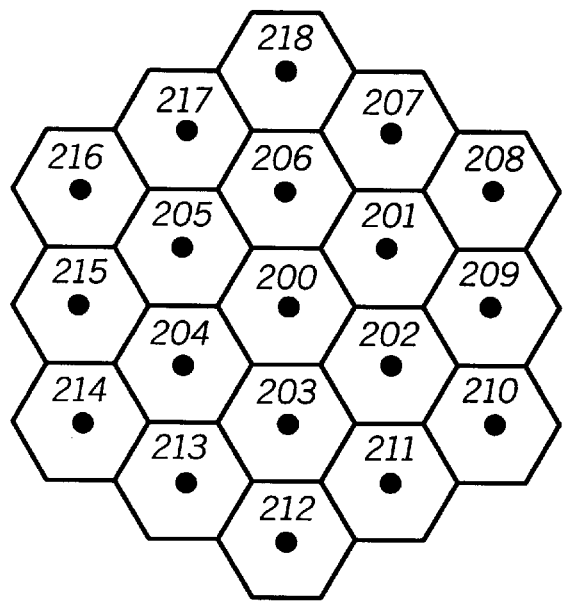
FIG. 2 depicts configuration of cell areas of a communication system and the neighbor list according to the prior art.
Figure 3:
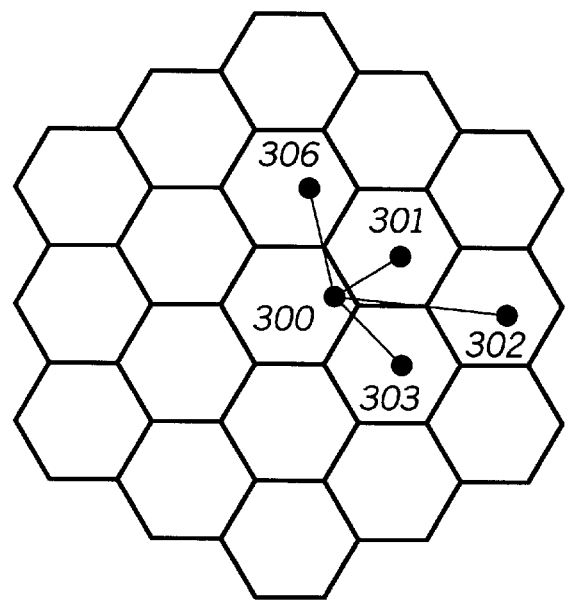
FIG. 3 depicts configuration of cell areas of a communication system and the neighbor list according to one aspect present invention.

With reference to FIG. 2, cell configurations of a code division multiple access communication system contains 19 cells, 200–218. Each cell may be served by one base station. An initial list transmitted to a mobile station may contains the entire list from 200 to 218. With reference to FIG. 3, for example, if the mobile station is in cell 300, the neighbor list is modified according to the location of the mobile station, and thus, only a neighbor list containing cells 301–303 and 306 is transmitted to the mobile station. As a result, according to the present invention, the mobile station only scans a limited number of pilot signals transmitted from these base station. Therefore, the mobile station battery power is conserved. Moreover, the hand-off process is accomplished by the mobile station with a hardware engine which has a very low complexity. This results additionally in lower power consumption in the mobile station. The selected neighbor list as a result of being in close proximity of the mobile station provides the most relevant neighbor list which are most likely to be a candidate in the Neighbor Set for a hand-off routine. This eliminates a need to repeat scanning for pilot signals when all other candidates in Active and Candidate Sets are exhausted. This allows the mobile station to complete the hand-off routine without undue delay.

In FIG. 1, blocks 190 and 191 are shown to indicate location finding capacity of base stations 150 and 160 respectively. A method and apparatus for determining communication units location are described in the United States issued patent to Ghosh et al, title: Method and Apparatus for Location Finding in a CDMA System, U.S. Pat. No. 5,508,708, issued Apr. 16, 1996. Accordingly, location finding and determining Neighbor Set may be performed either in the base stations or the mobile station or a combination of both. According to the preferred embodiment of the present invention, the location finding of the mobile station is performed by at least one of the base stations in the communication system. Among other alternatives, the location finding is performed by the mobile station. In this case, the mobile station then transmits a message to one of the base stations for determining the Neighbor Set according the location of the mobile station. According to the most preferred embodiment, the location finding is performed by one of the base station which is in communication with the mobile station. When a base station determines a list of the candidate pilots in the Neighbor Set in accordance with the present invention, the result is transmitted to the mobile station through an Extended Hand-off Direction Message according to the CDMA system protocols. Once a Neighbor Set is determined according to the location of the mobile station, subsequent messages are sent to update the list of candidates in the Neighbor Set. An update of the list may be needed according to a new location of the mobile station as it travels in the coverage area making other pilot signals better candidates to be included in the Neighbor Set. Accordingly, the existing candidates in the Neighbor Set which no longer presented to be good pilot signal candidates are canceled from the Neighbor Set.

To reduce the through-put overload of the communication system as a result of repeatedly transmitting Extended Hand-off Direction Message when the location of the mobile station is changing at a rapid rate, the determination of the Neighbor Set based on the mobile station location would then involves the speed of the mobile station. Furthermore, the direction which the mobile station is taking as it passes through the coverage area is taken into account to reduce the number of times which Extended Hand-off Direction Message is transmitted. For example, the Extended Hand-off Direction Message is not transmitted for updating the pilot candidates in the Neighbor Set as often when the mobile station is traveling at slow speed than fast. Moreover, when there is a pattern of movement in the coverage area which may be used to predict the next location of the mobile station, the Neighbor Set is determined according to the present and the possible near future locations of the mobile station.

Figure 4:
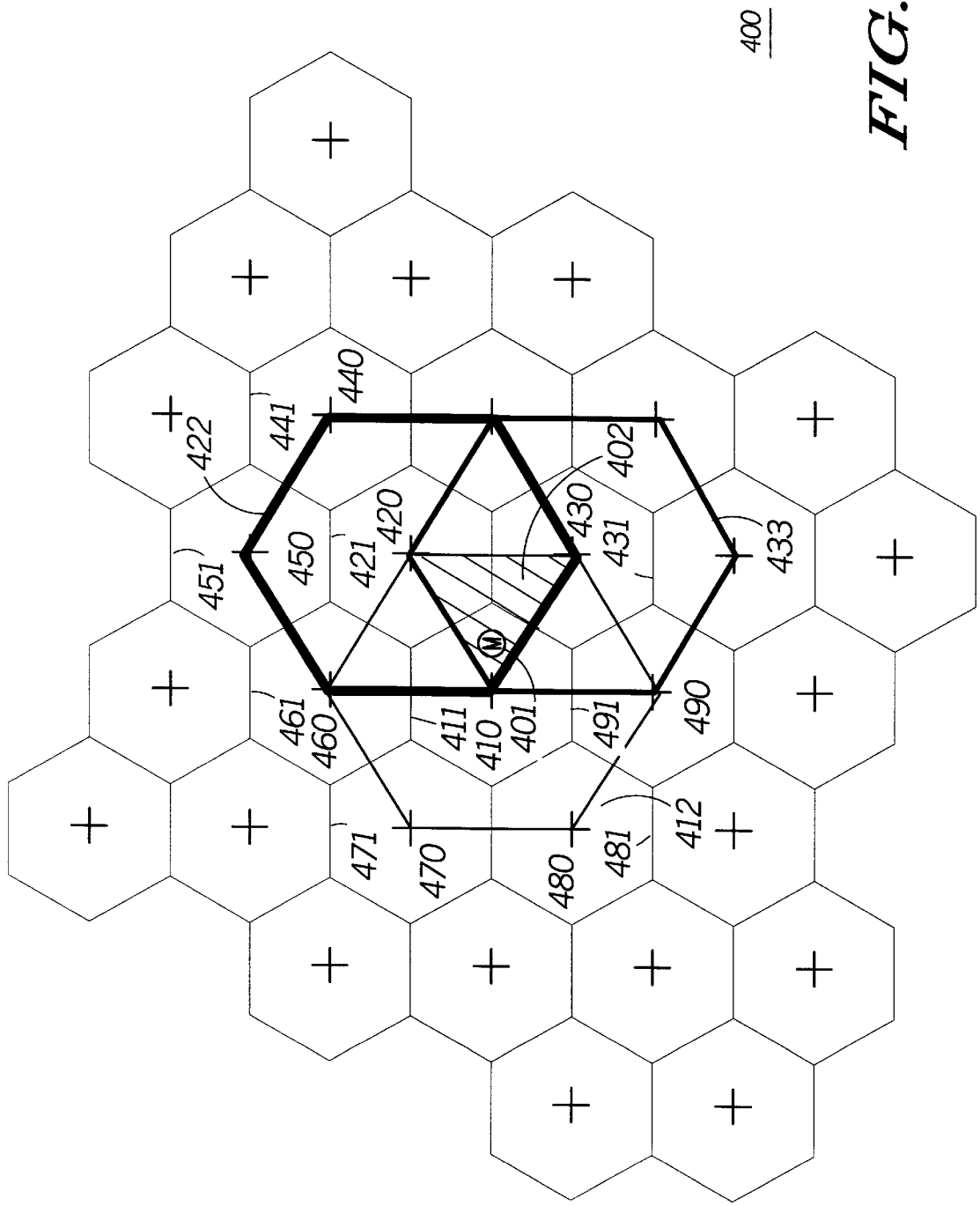
FIG. 4 depicts a configuration of cell areas and their associating regions in a communication system, and the graphical details of determining the neighbor list according to another aspect of present invention.

In reference to FIG. 4, a communication system 400 includes many base stations, such as 410–490. Each base station provides wireless coverage over a corresponding cell area. The hexagonal polygons 411, 421, 431, 441, 451, 461, 471, 481 and 491 are corresponding cell areas of base stations 410, 420, 430, 440, 450, 460, 470, 480 and 490 respectively. Although these cell areas are shown to be nicely arranged, in field application, the cell areas have very often irregular shape. For example, a mobile station 401 located in one of the cell areas 411 transmits a Pilot Strength Measurement Message which includes a Neighbor Set of a list of a hand-off candidate base stations. In the prior art, the list in the Neighbor Set would include many of the base stations as are shown. According to the present invention, the list is substantially reduced to include base station 410, 420 and 430, in this example. In accordance with the present invention, a method of determining the Neighbor Set according to a location of the mobile station 401 first includes associating a region corresponding to each of the cell areas. Each region extends beyond its corresponding cell area. For example, hexagonal polygons 412, 422 and 433 are depicting the boundaries of the associating regions corresponding to cell areas 411, 421 and 432. Then, the overlapped areas, where two or more of the regions are overlapping, are determined. In this example, the triangular shaped overlapped area 402 is shown. Next, the location of the mobile station 401 is determined. If the mobile station 401 is in the overlapped area 402, the list of the hand-off candidate base stations in the Neighbor Set contains at least the base stations which their corresponding cell areas have associating regions that are overlapping over the area where the mobile station 401 is located. In this example, mobile station 401 which is shown to be located in overlapped area 402 contains a Neighbor Set candidates that includes at least base stations 410, 420 and 430.

The regions are selected to cover at least a partial area of one of the neighbor cell areas. For example, the region 412 associated with cell 411 extends over cell areas of 421, 431, 461, 471, 481 and 491. The region 412 is shown to cover a partial area of all of the nearest neighbor cell areas. In practical application of the present invention, the shape of cell areas may be very irregular. In that case, a computer may be used to determine the associating regions and overlapped areas.

While the invention has been particularly shown and described with reference to a particular embodiment, it will be understood by those skilled in the art that various changes in form and details may be made therein without departing from the spirit and scope of the invention. The corresponding structures, materials, acts and equivalents of all means or step plus function elements in the claims below are intended to include any structure, material, or acts for performing the functions in combination with other claimed elements as specifically claimed.

What is claimed is:

1. A method of determining a Neighbor Set in a communication system, the communication system providing wireless communication, the communication system including a plurality of base stations which provide wireless coverage over a corresponding plurality of cell areas, and a mobile station located in one of said plurality of cell areas, the mobile station transmitting a Pilot Strength Measurement Message including a Neighbor Set of a list of a plurality of hand-off candidate base stations, the method comprising the steps of:

associating a plurality of regions corresponding to said plurality of cell areas where each region extends beyond its corresponding cell area;

determining overlapped areas where two or more of said plurality of regions are overlapping;

determining whether said mobile station location is in one of the overlapped areas, said list of said plurality of hand-off candidate base stations in said Neighbor Set including at least the base stations having associated regions that overlap the area where said mobile station is located;

wherein the extent of one of said plurality of regions is at least as far as covering a partial area of another cell area in said plurality of cell areas.

2. The method as recited in claim 1 wherein the extent of one of said plurality of regions is as far as at least covering a partial area of a nearest cell area in said plurality of cell areas.

3. A method of determining a Neighbor Set in a communication system, the communication system providing wireless communication in a coverage area, the communication system including a plurality of base stations transmitting at least a corresponding plurality of pilot signals, and a mobile station receiving at least one of the plurality of pilot signals and transmitting a Pilot Strength Measurement Message including a Neighbor Set of a list of a plurality of candidate pilots, the method comprising the steps of:

finding a location of said mobile station in said coverage area;

determining said list of plurality of candidate pilots in said Neighbor Set according to the location of said mobile station; and determining an attribute of said mobile station in said coverage area to be used in determining said list of plurality of candidate pilots, said attribute comprising one of a speed of said mobile station movement in said coverage area, and a direction of said mobile station movement in said coverage area.

4. A method of determining ads recited in claim 3, wherein said attribute is used in deciding a frequency of performing said determining step.

* * * * *